United States Patent
Natsukawa et al.

[11] Patent Number: 6,163,677
[45] Date of Patent: Dec. 19, 2000

[54] PORTABLE SATELLITE COMMUNICATION TERMINAL SYSTEM

[75] Inventors: Shinji Natsukawa; Hiroyuki Morimoto, both of Tokyo, Japan

[73] Assignee: Mitsubishi Denki Kabushiki Kaisha, Tokyo, Japan

[21] Appl. No.: 09/285,465

[22] Filed: Apr. 2, 1999

Related U.S. Application Data

[63] Continuation of application No. 08/713,647, Sep. 13, 1996.

[30] Foreign Application Priority Data

Sep. 13, 1995 [JP] Japan .................................. 7-235045

[51] Int. Cl.[7] .................................................. H04B 7/15
[52] U.S. Cl. ........................ 455/11.1; 455/427; 455/517
[58] Field of Search ................................ 455/12.1, 13.1, 455/13.2, 517, 524, 422, 427, 428, 429, 430, 11.1

[56] References Cited

U.S. PATENT DOCUMENTS

| | | | |
|---|---|---|---|
| 4,647,722 | 3/1987 | Nishida et al. | 379/63 |
| 4,659,878 | 4/1987 | Dinkins | 370/71 |
| 5,073,972 | 12/1991 | Tendler et al. | 455/35 |
| 5,109,526 | 4/1992 | Reed | 455/11.1 |
| 5,412,660 | 5/1995 | Chen et al. | 455/12.1 |
| 5,490,284 | 2/1996 | Itoh et al. | 455/11.1 |
| 5,509,004 | 4/1996 | Bishop, Jr. et al. | 455/12.1 |
| 5,535,430 | 7/1996 | Aoki et al. | 455/552 |
| 5,535,432 | 7/1996 | Dent | 455/12.1 |
| 5,542,104 | 7/1996 | Ozawa et al. | 455/575 |
| 5,628,049 | 5/1997 | Suemitsu | 455/11.1 |

FOREIGN PATENT DOCUMENTS

| | | |
|---|---|---|
| 2628392 | 4/1993 | Australia . |
| 3029695 | 3/1996 | Australia . |
| 8904569 | 5/1989 | WIPO . |

*Primary Examiner*—Reinhard J. Eisenzopf
*Assistant Examiner*—Sam Bhattacharya
*Attorney, Agent, or Firm*—Rothwell, Figg, Ernst & Manbeck

[57] ABSTRACT

A satellite communication terminal system can execute voice communication even if it is placed at a location which is obstructed from a communication satellite by any object and has no telephone line. Further, a satellite communication terminal system for general purpose use and being extendible by using a satellite communication terminal comprises a portable satellite communication terminal for performing the voice communication with any other station through a communication satellite, a connection device and a radio telephone device including a base unit and hand units. The connection device comprises a terminal interface unit interfaced with the satellite communication terminal for controlling the transmission and reception of the satellite communication terminal and a channel control unit connected to the terminal interface unit for performing the channel connection to the radio telephone device. When the hand unit is placed at a location wherein the satellite communication terminal is not obstructed from the communication satellite, the voice communication with the other station can be accomplished through the satellite communication terminal at a location remote from the satellite communication terminal.

12 Claims, 5 Drawing Sheets

PORTABLE SATELLITE COMMUNICATION TERMINAL SYSTEM

This application is a continuation of Ser. No. 08/713,647, filed Sep. 13, 1996.

BACKGROUND OF THE INVENTION

1. Field of the Invention

The present invention relates to a satellite communication terminal system and particularly to a channel connection configuration for performing voice or facsimile communications through communication satellites.

2. Description of the Related Art

Figure 5:
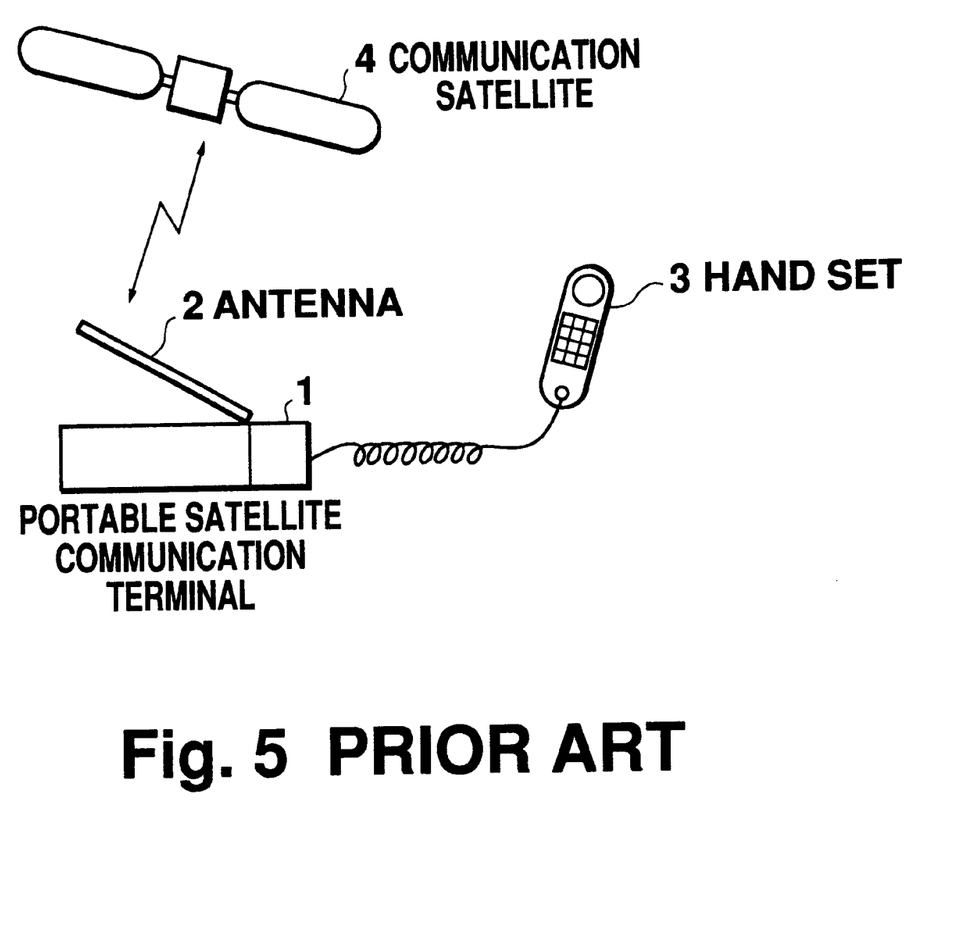
FIG. 5 is a schematic view of a portable satellite communication terminal constructed in accordance with the prior art.

FIG. 5 is a schematic view of a portable satellite communication terminal which uses the INMARSAT-M satellite according to the prior art. The satellite communication terminal 1 includes an antenna 2 mounted on the main body for performing the transmit-receive task between the antenna 2 and a communication satellite 4, and a handset 3.

In use, the satellite communication terminal 1 must be placed at a location where it is subjected to as little obstruction as possible. The antenna 2 must be directed towards the communication satellite 4. Thus, the communication can be accomplished in an effective manner. When keys on the handset 3 are manipulated, a voice call can be initiated.

Since the handset 3 is connected to the main body of the satellite communication terminal 1 through a cord, a user could not make a call at a position remote from the satellite communication terminal. Further, the satellite communication terminal 1 must be positioned at a position where its antenna 2 can be directed towards the communication satellite without any obstruction therebetween. It was therefore impossible to perform speech communication when the satellite communication terminal 1 was placed in the basement of a building on a solitary island having no telephone line, for example.

It is further desirable that the satellite communication terminal can execute data communication when it is connected to a non-telephone device such as facsimile or the like, in addition to the voice call through the telephone device.

SUMMARY OF THE INVENTION

It is therefore an object of the present invention to provide a satellite communication terminal system which can carry out voice communication even if it is at a location where it is obstructed from the communication satellite and has no telephone line.

Another object of the present invention is to provide a satellite communication terminal system which is general-purpose and has extension capabilities.

To this end, the present invention provides a satellite communication terminal system comprising a portable satellite communication terminal for executing communication to the other stations through a communication satellite; a radio telephone device including a base unit and hand unit for executing the wireless communication with the base unit; and a connection device for connecting the satellite communication terminal to the base unit of the radio telephone device, the connection device also being operative to channel connect the hand unit placed at a location remote from the satellite communication terminal to any other station through the satellite communication terminal. In such an arrangement, the user can carry out the communication to the other station when the satellite communication terminal is placed at a location remote from the satellite communication terminal, but can communicate to the communication satellite.

The connection device is characterized by the fact that it comprises a terminal interface unit interfaced with the satellite communication terminal for controlling the transmission and reception of the satellite communication terminal, and a channel control unit connected to the terminal interface for making the channel connection to the radio telephone device. In such an arrangement, the terminal interface unit sends a call setting request received by the satellite communication terminal to the channel control unit which in turn sends the call setting request to the base unit. As such a line connection is completed, voice signals sent from any other station are wirelessly transmitted to the hand unit through the satellite communication terminal, connection device and base unit. Thus, the voice call can be executed at a location remote from the satellite communication terminal.

The connection device is also characterized by the fact that it comprises a terminal interface unit interfaced with the satellite communication terminal for controlling the transmission and reception of the satellite communication terminal, a selection number extracting unit for extracting a selection number from signals received through the terminal interface unit, and a channel control unit for performing the channel connection with a radio telephone device corresponding to the selection number from the selection number extracting unit. In such an arrangement, the satellite communication terminal can be channel connected to one of a plurality of radio telephone devices that corresponds to the selection number discriminated on the call setting request.

The connection device is further characterized by the fact that it comprises a terminal interface unit interfaced with a plurality of satellite communication terminals for controlling the transmission and reception of each of the satellite communication terminals, a selection number extracting unit for extracting a selection number from signals received through the terminal interface unit, and a channel control unit for performing the channel connection with a radio telephone device corresponding to the selection number from the selection number extracting unit. In such an arrangement, a plurality of lines can simultaneously be connected to a plurality of satellite communication terminals.

In another aspect of the present invention, it provides a satellite communication terminal system comprising a portable satellite communication terminal including a non-telephone adaptor for performing communication to a non-telephone device, such as a facsimile or the like, through a communication satellite; a communication terminal device being in the form of a telephone or non-telephone device; and a connection device for connecting the satellite communication terminal to the communication terminal device, the connection device being operative to make the channel connection to both the telephone and non-telephone devices.

The connection device is characterized by the fact that it comprises a terminal interface unit interfaced with the non-telephone adaptor for controlling the transmission and reception of the satellite communication terminal, a selection number extracting unit for extracting a selection number from signals received through the terminal interface unit, and a channel control unit for performing the channel connection to a satellite communication terminal corresponding to the selection number from the selection number extracting unit. In such an arrangement, the satellite communication terminal system can be connected not only to the radio telephone device, but also to the non-telephone device. This can improve the general-purpose nature of the system in and make it extendable.

According to one aspect of the present invention, communication with any other station can be accomplished through the satellite communication terminal if the satellite communication terminal is placed at a location remote from the satellite communication terminal, but can attain the communication with the communication satellite. Thus, the communication can be accomplished from a location where there is no telephone line and radiowaves cannot be received directly from the communication satellite, for example, from an underground construction site.

According to another aspect of the present invention, the satellite communication terminal system can be connected to a plurality of radio telephone devices and can accomplish the channel connection between the hand unit of any radio telephone device corresponding to a selection number specified through a call setting request and any other station emitting that call setting request.

According to still another aspect of the present invention, the satellite communication terminal system can be connected to a plurality of satellite communication terminals so that it can be channel connected to other stations through a plurality of lines at the same time.

According to a further aspect of the present invention, the satellite communication terminal system can be connected not only to a radio telephone device, but also to a non-telephone device. As a result, the present invention can provide a system which is more general purpose and is extendible.

DETAILED DESCRIPTION OF THE PREFERRED EMBODIMENTS

Several preferred embodiments of the present invention will be described with reference to the drawings in which parts similar to those of the prior art are designated by similar reference numerals.

First Embodiment

Figure 1:
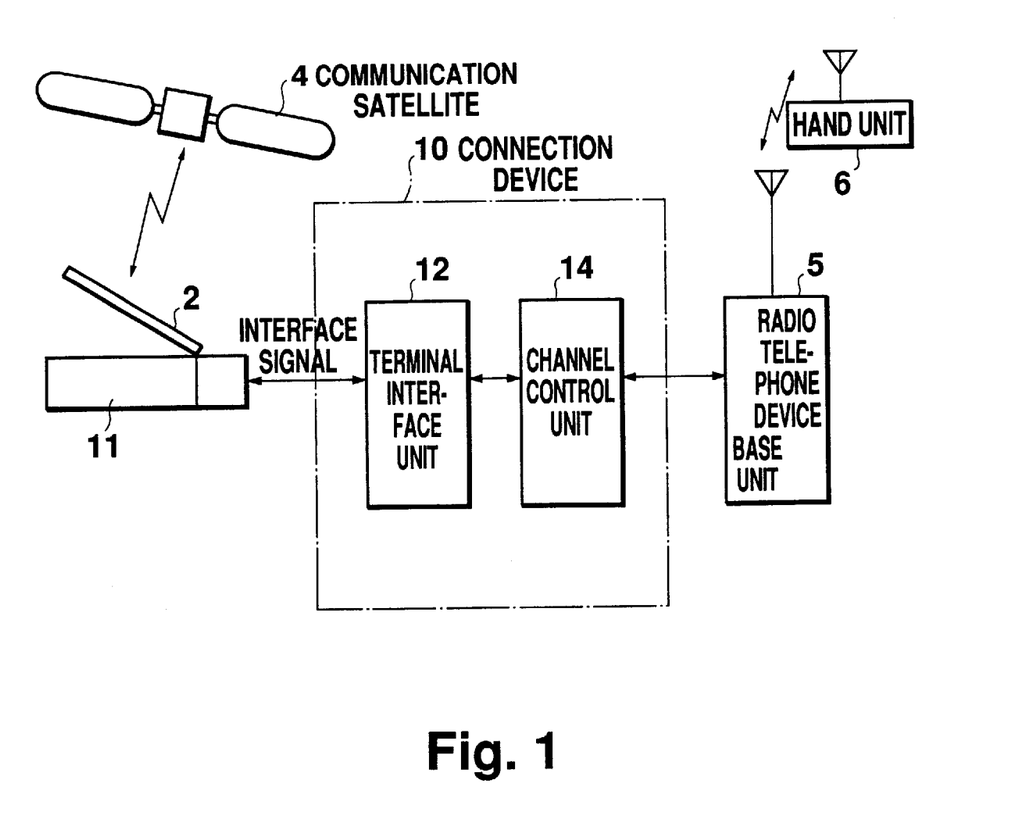
FIG. 1 is a schematic view of a first embodiment of a satellite communication terminal system constructed in accordance with the present invention.

FIG. 1 is a schematic view of a first embodiment of a satellite communication terminal system constructed in accordance with the present invention. The satellite communication terminal system comprises a portable satellite communication terminal 11 for performing the communication to any other station through a communication satellite 4, a radio telephone device comprising a base unit 5 and a hand unit 6 for performing the wireless communication with the base unit 5, and a connection device 10 for connecting the satellite communication terminal 11 to the base unit 5 of the radio telephone device. The satellite communication terminal 11 is portable, as in the prior art, and includes an antenna 2 mounted on the main body of the satellite communication terminal 11 for transmitting and receiving signals between the antenna 2 and the communication satellite 4. The connection device 10 comprises a terminal interface unit 12 interfaced with the satellite communication terminal 11 for controlling the transmission and reception of the satellite communication terminal 11 and a channel control unit 14 connected to the terminal interface unit 12 for performing the channel connection with the radio telephone device.

The first embodiment is characterized by the fact that the satellite communication terminal 11 can carry out a voice call with any other station at a location remote from the satellite communication terminal 11, for example, in the basement of a building, or on a solitary island having no telephone line.

The operation will now be described.

Referring to FIG. 1, to execute the radio communication through the communication satellite 4, the main body of the satellite communication terminal 11 is placed at a location not obstructed from the communication satellite 4 by any object, as in the prior art. The antenna 2 is directed towards the communication satellite 4 and moves along its trajectory. When the satellite communication terminal 11 receives signals from any other station, the satellite communication terminal 11 confirms whether or not a call setting request is directed to the satellite communication terminal itself. The terminal interface unit 12 sends the call setting request received from the satellite communication terminal 11 as interface signals to the channel control unit 14. The channel control unit 14 then sends this call setting request to the base unit 5, resulting in channel connection. Details of the channel connection procedure using control signals or the like are omitted herein since it uses the conventional system.

On channel connection, voice signals sent from the other station through the communication satellite 4 and satellite communication terminal 11 are wirelessly transmitted to the hand unit 6 through the base unit 5. Thus, a user can make a voice call through the hand unit 6 at a location remote from the satellite communication terminal 11. When the user wants to call any external station through the hand unit 6, the channel can be connected to the satellite communication terminal 11 in the reverse procedure.

According to the first embodiment, therefore, the satellite communication terminal 11 can be connected to any other station to execute the talking at a location remote from the satellite communication terminal 11 when the satellite communication terminal 11 is placed at a position not obstructed from the communication satellite 4 by any matter and the hand unit 6 is wirelessly connected to the base unit 5. Therefore, the voice call between the satellite communication terminal 11 and the other station can be executed even at a location where there is no telephone line and radiowaves cannot be directly received from the communication satellite 4, for example, in an underground construction site. Further, the satellite communication terminal system can be utilized at an area where the signals of an automobile wireless telephone cannot be received.

The satellite communication terminal 11 may judge a destination of received signals through the conventional reception processing function. However, the satellite communication terminal 11 can be used merely as means for performing the communication through the communication satellite 4. Such a judgment may be accomplished through a function included in the connection device 10. If the satellite communication terminal 11 is of an intelligent type that is suitable for use in ISDN (Integrated Service Digital Network), information of reception/transmission control, as well as transmitter number, may be sent to the connection device 10, resulting in further improvement of the system.

Although the connection device 10 is separately formed from the satellite communication terminal 11 and radio telephone device in the first embodiment, the connection device 10 may be assembled into each of the satellite communication terminal 11 and radio telephone device. With such an independent connection device as in the first embodiment, however, the satellite communication terminal 11 may be connected to any existing satellite communication terminal not connected directly to the radio telephone device or to a plurality of satellite communication terminals, as will be described later. This can make the system more general-purpose and extendible.

The radio telephone device is considered to be any of a general cordless telephone, a specific low-power wireless telephone or the like. However, The radio telephone device may be a telephone device including a single base unit and a plurality of hand units wirelessly connected to the base unit or any other wireless communication device having the same function.

Second Embodiment

Figure 2:
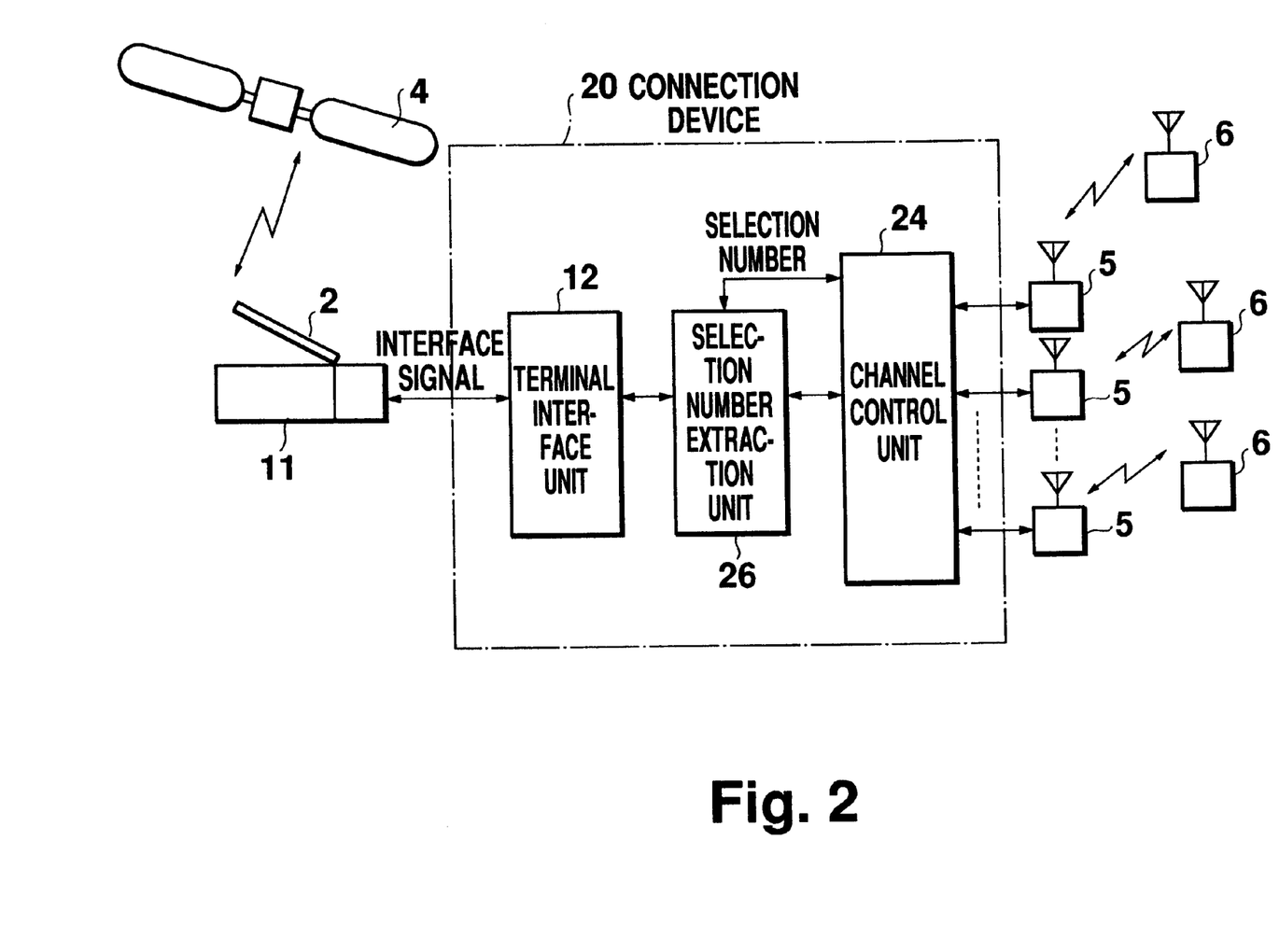
FIG. 2 is a schematic view of a second embodiment of a satellite communication terminal system constructed in accordance with the present invention.

FIG. 2 is a schematic view of a second embodiment of a satellite communication terminal system constructed in accordance with the present invention. In this figure, parts similar to those of the first embodiment are designated by similar reference numerals. A connection device 20 comprises a terminal interface unit 12 interfaced with the satellite communication terminal 11 for controlling the transmission and reception of the satellite communication terminal 11, a selection number extracting unit 26 for extracting a selection number from signals received through the terminal interface unit 12, and a channel control unit 24 connectable between the connection device 20 and a plurality of radio telephone devices and adapted to make the channel connection with a radio telephone device corresponding to the selection number from the selection number extracting unit 26.

The second embodiment is characterized by the fact that it can select and call any one of the radio telephone devices which corresponds to the selection number discriminated on the call setting request. Although the first embodiment is adapted to connect with only a single radio telephone device, the second embodiment can handle selected numbers corresponding to a plurality of radio telephone devices so that the satellite communication terminal can be connected to the radio telephone devices.

In operation, the satellite communication terminal 11 is placed and used in the same manner as in the first embodiment. Therefore, only a case where a call setting request is sent from any other station to the satellite communication terminal 11 will be described below.

Referring to FIG. 2, when the satellite communication terminal 11 receives a call setting request to itself, the selection number extracting unit 26 extracts a specific selection number from interface signals received from the satellite communication terminal 11 through the terminal interface unit 12. For example, if the second embodiment is applied to ISDN, a terminal on the extension side can be specified through DDI (Direct Dialing In) or subaddress. When the satellite communication terminal 11 sends an ISDN number such as DDI or the like included in the call setting request to itself to the connection device 20 as interface signals, the selection number extracting unit 26 can extract a specific selection number from the interface signals according to a preselected protocol.

The channel control unit 24 executes the channel connection by sending the call setting request to any one of the radio telephone devices which corresponds to the selection number from the selected-number extracting unit 26.

On channel connection, voice signals sent from the other station through the communication satellite 4 and satellite communication terminal 11 are wirelessly transmitted to the hand unit 6 via the base unit 5 corresponding to the specified selection number. Thus, the user can perform the voice communication through the hand unit 6 even at a location remote from the satellite communication terminal 11. When the user wants to call any other external station through the hand unit 6, the channel connection can be accomplished through the reverse procedure.

According to the second embodiment, thus, the satellite communication terminal 11 can be connected to a plurality of radio telephone devices. In addition, the hand unit of a radio telephone device corresponding to a selection number specified by the call setting request can be channel connected to the other station emitting this call setting request.

The terminal on the extension side connected to the connection device 20 was the radio telephone device, but may be any one of an analog telephone or facsimile.

Third Embodiment

Figure 3:
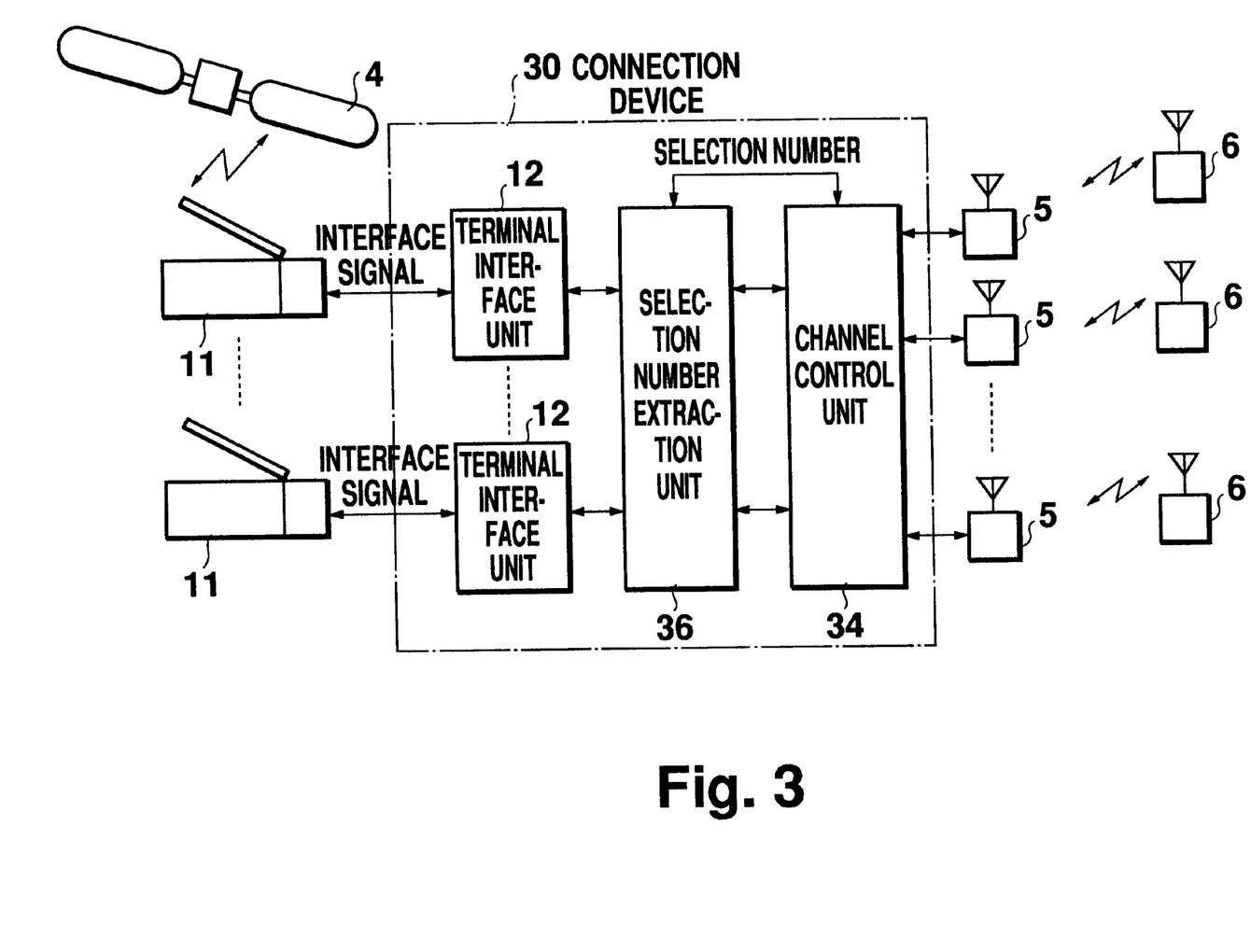
FIG. 3 is a schematic view of a third embodiment of a satellite communication terminal system constructed in accordance with the present invention.

FIG. 3 is a schematic view of a third embodiment of a satellite communication terminal system constructed in accordance with the present invention. In this figure, parts similar to those of the second embodiment are designated by similar reference numerals. In the third embodiment, a connection device 30 comprises a plurality of terminal interface units 12 respectively interfaced to a plurality of satellite communication terminals 11 for controlling the transmission and reception of each of the satellite communication terminals 11, a selected-number extracting unit 36 for extracting a selection signal from signals received through each of the terminal interface units 12, and a channel control unit 34 for performing the channel connection with a radio telephone device corresponding to the selection number from the selected-number extracting unit 36.

The third embodiment is characterized by the fact that it comprises a plurality of connectable satellite communication terminals 11 for performing the simultaneous connection of a plurality of channels, in addition to the functions of the second embodiment.

When a call setting request is sent from any other station to the third embodiment, the third embodiment functions substantially in the same manner as in the second embodiment except that the selected-number extracting unit 36 extracts a selection number included in interface signals from any of the satellite communication terminals 11 through the corresponding one of the terminal interface unit 12. Therefore, the details thereof are omitted herein.

When a call is requested by any one of the hand units 6, the connection device 30 controls to select any one satellite communication terminal 11 that is not currently being.

Since the connection device 30 of the third embodiment includes a plurality of terminal interface units 12 corresponding to the respective satellite communication terminals 11, the system can easily be extended. However, the third embodiment may be applied to a terminal interface unit which can be connected to a plurality of satellite communication terminals.

Fourth Embodiment

Figure 4:
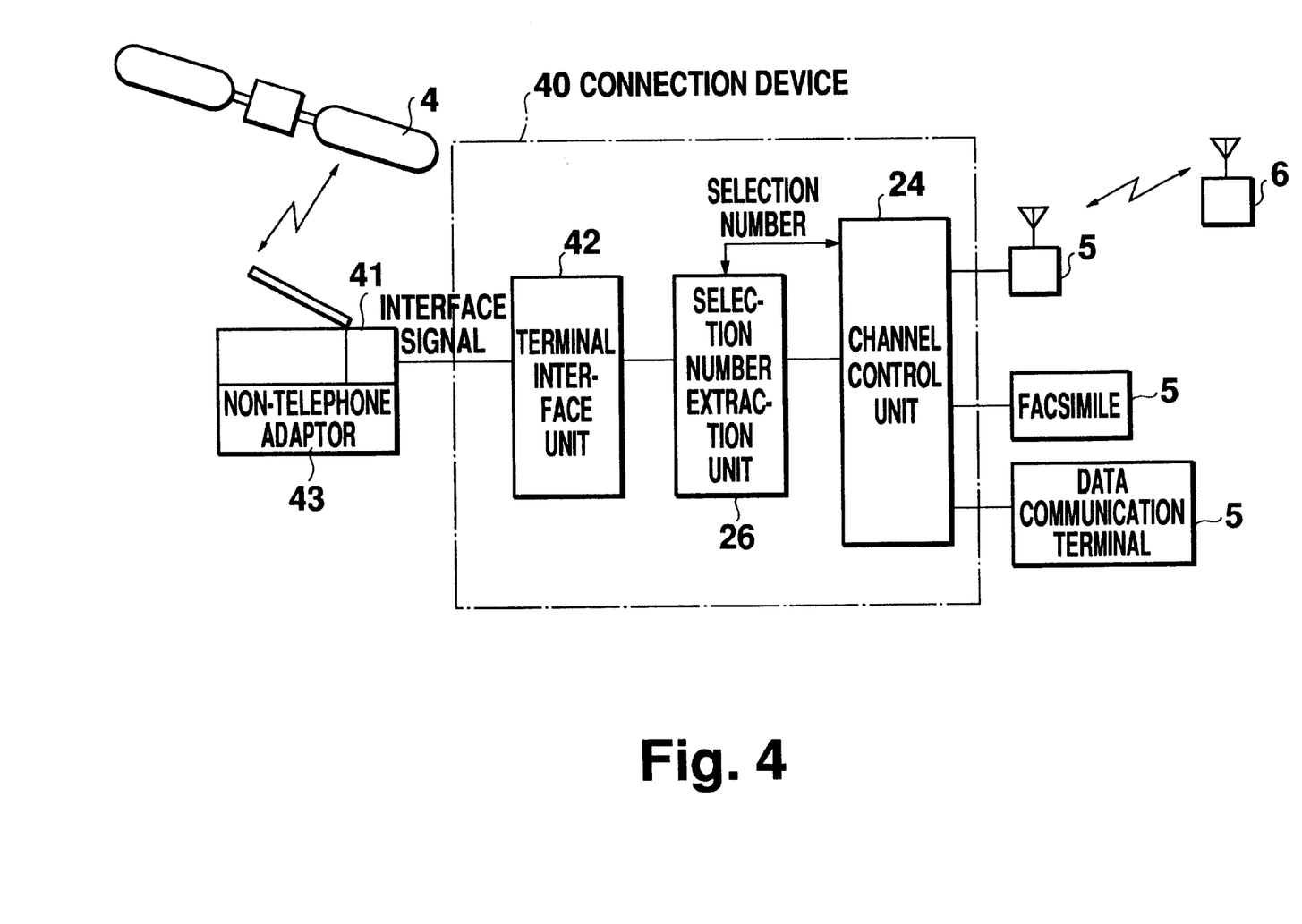
FIG. 4 is a schematic view of a fourth embodiment of a satellite communication terminal system constructed in accordance with the present invention.

FIG. 4 is a schematic view of a fourth embodiment of a satellite communication terminal system constructed in accordance with the present invention. In this figure, parts similar to those of the second embodiment are designated by similar reference numerals. In the fourth embodiment, a satellite communication terminal system comprises a portable satellite communication terminal 41, a communication terminal device and a connection device 40. The satellite communication terminal 41 includes a non-telephone adaptor for performing the communication with a non-telephone device, such as a facsimile or the like, through the communication satellite 4. The communication terminal device is divided into two parts, a telephone device for carrying out voice communication with the other stations and a communication terminal device for mainly accomplishing the data communication with a facsimile 7 or the like, rather than the voice communication. FIG. 4 shows a radio telephone device including base and hand units 5, 6 and a non-telephone device including a facsimile 7 and a data communication terminal 8. The connection device 40 connects the satellite communication terminal 41 to the communication terminal device. In the fourth embodiment, the connection device 40 comprises a terminal interface unit 42 interfaced with the non-telephone adaptor 43 to control the transmission and reception of the satellite communication terminal 41, a selection number extracting unit 26 for extracting a selection number from signals received through the terminal interface unit 42, and a channel control unit 24 for performing the channel connection with a communication terminal device corresponding to the selection number from the selection number extracting unit 26.

The fourth embodiment is characterized by that the satellite communication terminal system can be channel connected not only to the radio telephone device, but also to the non-telephone device including the facsimile 7 and the like.

More particularly, in the fourth embodiment, the non-telephone adaptor 43 is mounted in the satellite communication terminal 41 so that normal speech can be distinguished from the data communication through the non-telephone device. The identified information is reported to the connection device 40 as interface signals. In the fourth embodiment, the selection number extracting unit 26 can specify a communication terminal device to be channel connected by the use of a selection number as in the second embodiment. Therefore, the channel control unit 24 can select and call any one of facsimiles 7 and data communication terminals 8 connected thereto which corresponds to a selection number discriminated by a call setting request. Details in each of the components are similar to those of the previously described embodiments and will not further be described.

Although the fourth embodiment has been described as to a single satellite communication terminal 41, it may be applied to a plurality of satellite communication terminals as in the third embodiment.

What is claimed is:

1. A satellite communication terminal system comprising:
   a portable satellite communication terminal for executing communications with other communication stations through a communication satellite;
   a radio telephone device including a base unit, and a hand-held unit for performing wireless communications with the base unit; and
   a connection device connected to the portable satellite communication terminal by wire for connecting said radio telephone device through a communication channel to any other communication station via the portable satellite communication terminal,
   wherein both said radio telephone device, including said base unit and said hand-held unit, and said connection device are portable devices independent of said satellite communication terminal,
   whereby a user of said satellite communication terminal system is enabled to carry out communications with said other communication stations even when said user is at a location that is obstructed from said communication satellite and has no communication line.

2. A satellite communication terminal system as defined in claim 1 wherein said connection device comprises:
   a terminal interface unit interfaced with the satellite communication terminal for controlling transmission and reception of the satellite communication terminal; and
   a channel control unit connected to the terminal interface unit for executing the channel connection to the radio telephone device.

3. A satellite communication terminal system as defined in claim 1 wherein said satellite communication terminal is used only as communication means and wherein said connection device has a reception processing function.

4. A satellite communication terminal system as defined in claim 1 wherein said satellite communication terminal is of a type suitable for use in ISDN.

5. A satellite communication terminal system as defined in claim 1 wherein said connection device is incorporated in said radio telephone device.

6. A satellite communication terminal system as defined in claim 1 wherein said connection device comprises:
   a terminal interface unit interfaced with the satellite communication terminal for controlling transmission and reception of the satellite communication terminal;
   a selection number extracting unit for extracting a selection number from signals received through the terminal interface unit; and
   a channel control unit for executing a channel connection with the radio telephone device corresponding to the selection number from the selection number extracting unit.

7. A satellite communication terminal system as defined in claim 1 wherein said connection device comprises:
   a terminal interface unit interfaced with a plurality of satellite communication terminals for controlling transmission and reception of each of the satellite communication terminals;
   a selection number extracting unit for extracting a selection number from signals received through the terminal interface unit; and
   a channel control unit for performing a channel connection with the radio telephone device corresponding to the selection number from the selection number extracting unit, wherein the satellite communication terminal system can be connected to a plurality of lines at the same time.

8. A satellite communication terminal system as defined in claim 7 wherein said satellite communication terminal system comprises a plurality of said terminal interface units respectively corresponding to the individual satellite communication terminals.

9. A satellite communication terminal system as defined in claim 7 wherein a single terminal interface unit controls all the satellite communication terminals.

10. A satellite communication terminal system as defined in claim 8 wherein said connection device comprises;

a terminal interface unit interfaced with the non-telephone adaptor for controlling transmission and reception of the satellite communication terminal;

a selection number extracting unit for extracting a selection number from signals received through the terminal interface unit; and a channel control unit for performing a channel connection to a satellite communication terminal corresponding to the selection number from the selection number extracting unit.

11. A satellite communication terminal system as defined in claim 1, wherein said portable satellite communication terminal further includes a non-telephone adaptor for carrying out communications with a non-telephone device such as a facsimile machine or the like through said communication satellite, and said connection device includes the capability of connecting said non-telephone device to said portable satellite communication terminal.

12. The satellite communication terminal system according to claim 1, wherein:

said connection device is connected by wire to the satellite communication terminal and the base unit of said radio telephone device, and said radio telephone device and said connection device are transportable together with said satellite communication terminal while being connected by wire.

* * * * *